(12) United States Patent
Emilsson

(10) Patent No.: US 8,006,812 B2
(45) Date of Patent: Aug. 30, 2011

(54) DISC BRAKE CALIPER

(75) Inventor: Fred Emilsson, Trelleborg (SE); Ulla Melin Emilsson, legal representative, Trelleborg (SE); Johan Martensson, legal representative, Landskroma (SE)

(73) Assignee: Faiveley Transport Nordic AB (SE)

( * ) Notice: Subject to any disclaimer, the term of this patent is extended or adjusted under 35 U.S.C. 154(b) by 29 days.

(21) Appl. No.: 12/246,962

(22) Filed: Oct. 7, 2008
(Under 37 CFR 1.47)

(65) Prior Publication Data
US 2009/0229930 A1 Sep. 17, 2009

Related U.S. Application Data

(63) Continuation of application No. PCT/EP2007/002978, filed on Apr. 3, 2007.

(30) Foreign Application Priority Data

Apr. 7, 2006 (SE) ...................................... 0600788

(51) Int. Cl.
B61H 5/00 (2006.01)
B61H 13/34 (2006.01)
(52) U.S. Cl. ........................ 188/59; 188/72.9; 188/206 R
(58) Field of Classification Search .................... 188/58, 188/59, 205 R, 206 R, 206 A, 26, 28, 18 A, 188/72.9
See application file for complete search history.

(56) References Cited

U.S. PATENT DOCUMENTS

| 2,479,085 | A | * | 8/1949 | Schrage | 188/59 |
| 2,584,940 | A | * | 2/1952 | Tack | 188/59 |
| 3,604,538 | A | * | 9/1971 | Tompkin | 188/59 |
| 4,053,034 | A |   | 10/1977 | Katzer | |
| 4,454,932 | A | * | 6/1984 | Emilsson et al. | 188/59 |

FOREIGN PATENT DOCUMENTS

| DE | 2656052 A1 | 6/1978 |
| EP | 0050888 A1 | 5/1982 |
| EP | 0325117 A2 | 7/1989 |
| EP | 1357009 A2 | 10/2003 |

OTHER PUBLICATIONS

International Search Report, Jun. 21, 2007, 2 pages.

* cited by examiner

Primary Examiner — Thomas J Williams
(74) Attorney, Agent, or Firm — St. Onge Steward Johnston & Reens LLC

(57) ABSTRACT

A disc brake caliper for a rail vehicle comprises brake pad holders suspended—at either side of a brake disc to be braked—for movements only in a plane perpendicular to a substantially horizontal center-line of the caliper. Members of the caliper for transmitting movements from a brake unit to the brake pad holders are suspended from the vehicle via only elements of rubber-elastic material in an elastic joint allowing movements to a certain extent of said members in all directions. The elastic joint comprises at least one plate-shaped rubber-elastic element, which is substantially horizontally mounted in compression between a part for attachment to the vehicle and one of said members of the caliper.

10 Claims, 4 Drawing Sheets

DISC BRAKE CALIPER

CROSS-REFERENCE TO RELATED APPLICATIONS

The present application is a continuation of pending International patent application PCT/EP2007/002978 filed on Apr. 3, 2007 which designates the United States and claims priority from Swedish patent application 0600788-4 filed on Apr. 7, 2006, the content of which is incorporated herein by reference.

FIELD OF THE INVENTION

The present invention relates to a disc brake caliper for a rail vehicle, comprising brake pad holders suspended—at either side of a brake disc to be braked—for movements only in a plane perpendicular to a substantially horizontal centerline of the caliper, wherein members of the caliper for transmitting movements from a brake unit to the brake pad holders are suspended from the vehicle via only elements of rubber-elastic material in an elastic joint allowing movements to a certain extent of said members in all directions.

BACKGROUND OF THE INVENTION

A disc brake caliper for a rail vehicle normally comprises a brake actuator, pivotable levers for transmitting a brake force from the actuator to the levers, brake pad holders, pivotally arranged at the lever ends, and means for connecting the different members of the caliper. The brake pad holders are provided with exchangeable brake pads of a friction material for braking cooperation with a brake disc, over which the disc brake caliper is mounted astraddle.

The brake actuator is normally a pneumatic brake unit, comprising a brake cylinder or brake actuator and a slack adjuster or brake regulator. The space for such a disc brake caliper in the vicinity of the brake disc in the undercarriage or bogie of the rail vehicle is very limited, and it is thus desired to keep the overall dimensions of the disc brake caliper at a minimum.

An example of a measure to minimize the dimensions is to decrease the length of the pivotable levers, which means that their angular movements during operation are increased. This in turn may lead to undesirably great movements of the suspended brake pad holders in relation to the brake disc.

For obtaining controlled braking, it is in principle desired to have a geometrically constant engagement of the brake pads with the brake disc irrespective of the wear of the brake pads and the disc and also of the axial position of the axially slightly movable brake disc in relation to the disc brake caliper.

In order to fulfill these requirements, a basic measure is to suspend the brake pad holders in such a way that they are only movable in a plane perpendicular to a center-line of the caliper. The journaling of the brake pad holders is in principle as stiff as possible in other directions. As the brake pad holders are suspended in the described fashion, relative movements of other members of the caliper must be allowed. A disc brake caliper shown in EP-A-1 357 009 has separately suspended brake pad holders, and the remainder of the caliper is suspended via a bush containing rubber sleeves for elastically allowing certain relative movements. The design of the bush is, however, such that relative movements in the plane of the caliper center-line are not possible due to metallic contact in the bush.

A disc brake caliper shown in U.S. Pat. No. 4,053,034 can be regarded as the closest prior art. Here, a rubber bushing for elastic suspension of brake levers in a disc brake caliper is shown. Two conical rubber sleeves fill compartments between a cylinder and a shaft. Hereby the stiffness is constant in all directions. These disc brake caliper designs do accordingly not fulfill the requirements set out above.

SUMMARY OF THE INVENTION

The main object of the invention is to obtain a three-point supported disc brake caliper, which fulfills the above requirements. This is according to the invention attained in that the elastic joint comprises at least one plate-shaped rubber-elastic element, which is substantially horizontally mounted in compression between a part for attachment to the vehicle and one of the caliper members for transmitting movements from the brake unit to the brake pad holders.

As desired, the stiffness in the vertical direction will hereby be substantially greater in the vertical direction than in all other directions, whereas the stiffness against torsion in the horizontal direction is as small as possible. The force transmitting capability and the useful service life will be maximized by the horizontal, prestressed rubber-elastic elements.

With the prior disc brake calipers mentioned above the brake pad holders and the bush are to be suitably supported from the undercarriage or bogie of the rail vehicle.

In contrast hereto a preferred embodiment of a disc brake caliper according to the invention is provided with a mounting bracket, from which the brake pad holders and the members of the caliper for transmitting movements from the brake unit to the brake pad holders are suspended and which is to be attached in the rail vehicle. In a practical embodiment of a disc brake caliper according to the invention the elastic joint is arranged between the mounting bracket and a bridge piece, to which levers for transmitting movements from the brake unit to the brake pad holders are pivotally connected.

Preferably, the at least one rubber element is mounted between the mounting bracket and the bridge piece. In a practical embodiment, the bridge piece is clamped without metallic connection between the mounting bracket and a plate-shaped rubber element on the one side and a plate and a plate-shaped rubber element on the other side, the plate being attached to the mounting bracket by means of screws. It is important for the function and longevity of the rubber elements that they always work under a predetermined compression. This is obtained in that the screws are surrounded by distance sleeves determining the distance between the mounting bracket and the plate.

BRIEF DESCRIPTION OF THE DRAWINGS

Brief Description of the Drawings The invention will be described in further detail below under reference to the accompanying drawings, in which.

DETAILED DESCRIPTION OF THE INVENTION

Figure 3:
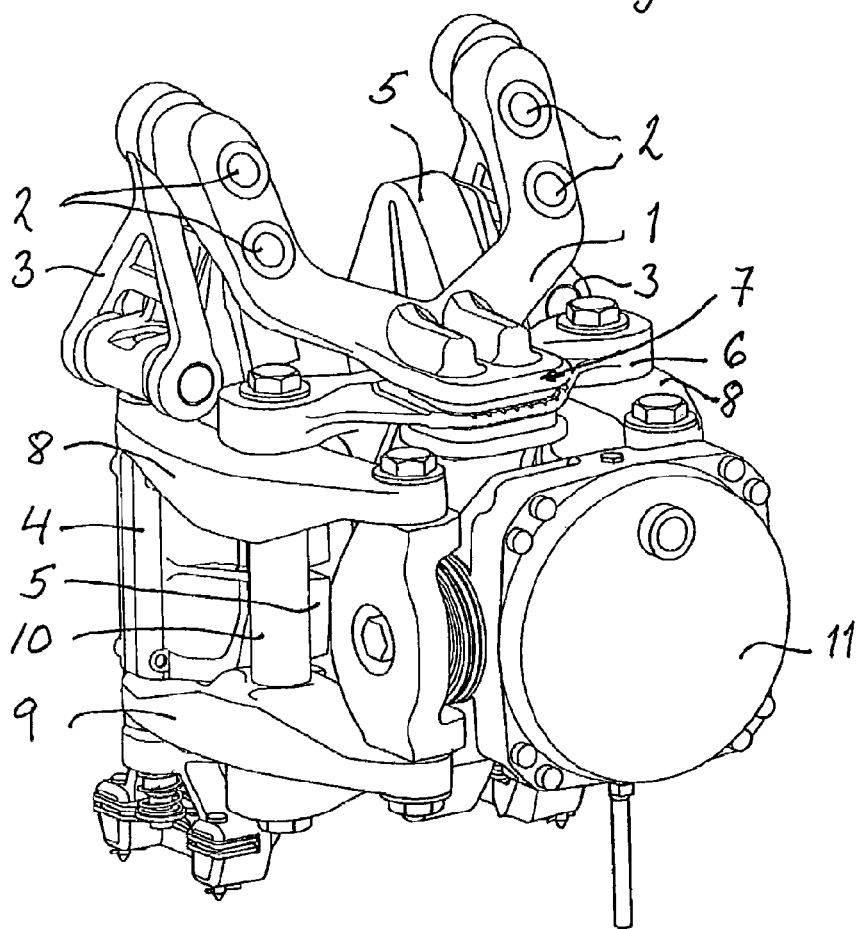
FIG. 3 is an isometric view from the rear of the disc brake caliper according to the invention.

Detailed Description of Embodiments A disc brake caliper of the type shown in the drawings is primarily intended to be mounted in an undercarriage or bogie of a rail vehicle for braking engagement with a brake disc, either separately mounted on a wheel axle of the vehicle or on the rotating wheel itself, as is well known in the art. The disc brake caliper could also be used in other vehicles. The disc brake caliper shown in the drawings is intended for engagement with a separate axle-mounted brake disc, but there is no principal difference in a caliper for a wheel-mounted disc.

Figure 1:
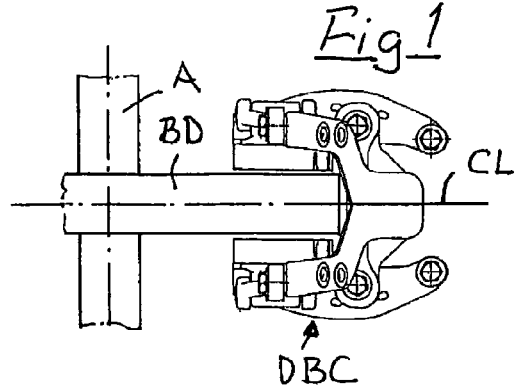
FIGS. 1 and 2 are a top view and a side view, respectively, showing very schematically and to a small scale a disc brake arrangement with a disc brake caliper according to the invention.
Figure 2:
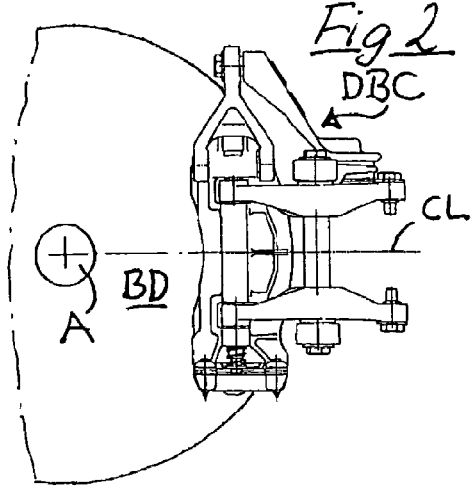

A disc brake arrangement with an axle-mounted brake disc is very schematically illustrated in FIGS. 1 and 2. A brake disc BD is attached to a wheel axle A of the rail vehicle. A disc brake caliper DBC of the invention is mounted (in a way to be described below) astraddle of the brake disc BD in a portion (undercarriage or bogie) of the rail vehicle in which the wheel axle A is journalled. The brake disc BD is shown in a position in which a center-line CL of the disc brake caliper DBC is in line with a center plane of the brake disc BD and is directed towards the center of the wheel axle A. The wheel axle A with the brake disc BD is, however, normally axially movable to a limited extent, which means that the brake disc BD may be somewhat offset in relation to the disc brake caliper DBC, as will appear below. The center- line CL of the disc brake caliper DBC is perpendicular to the wheel axle A. hi the description the direction "forwards" in the caliper is towards the brake disc. Other direction or position words, such as "upper" and "lower" are related thereto.

Figure 4:
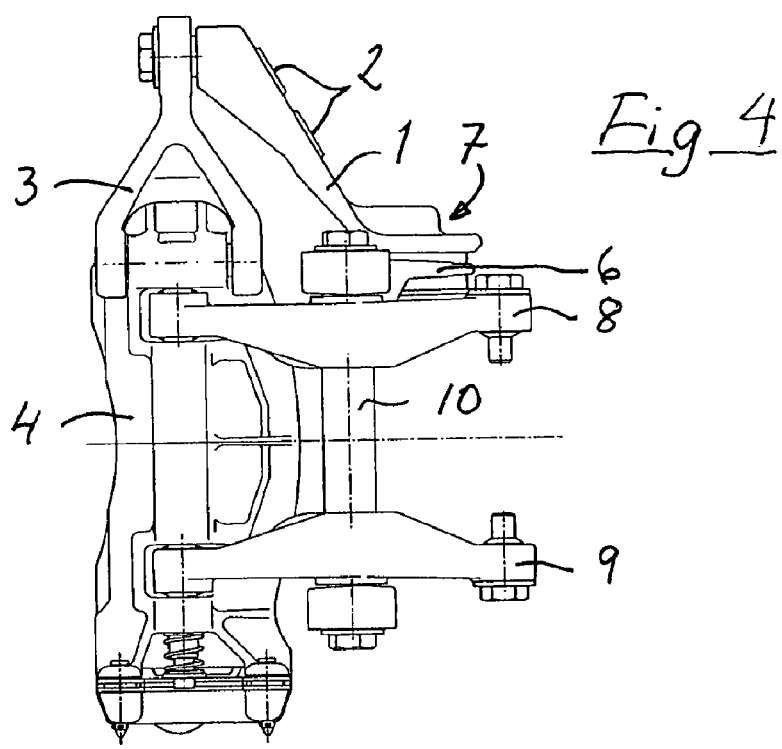
FIG. 4 is a side view of the caliper without a brake unit.
Figure 5:
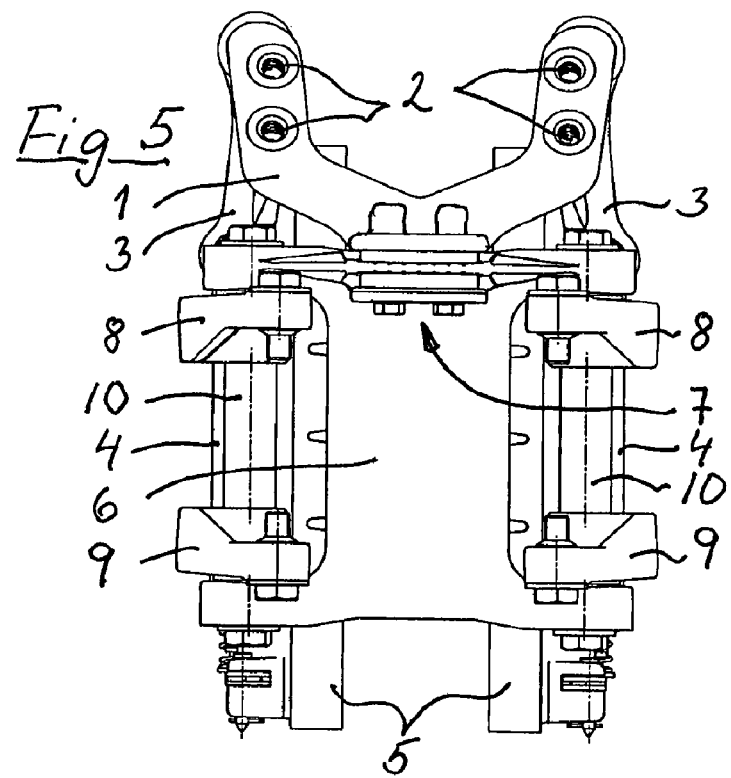
FIG. 5 is a view from the rear of the caliper without a brake unit.

Reference is now made especially to FIG. 3, but also FIGS. 4 and 5. The disc brake caliper shown therein has a mounting bracket 1. This bracket 1 has a number of holes 2 for its attachment to a suitable element (not shown) in the undercarriage or bogie of the rail vehicle. It is, however, important to note that a disc brake caliper according to the invention can be mounted or supported by other means, as will appear below.

The bracket 1 constitutes a three-point support in the caliper. The bracket 1 is forwardly (to the left in FIGS. 3 and 4) bifurcated. A suspension link 3 is pivotally suspended in each forward end of the bifurcated bracket 1. The pivot axis is parallel with the center-line CL (FIGS. 1 and 2) and the brake disc BD. At its lower end, each suspension link 3 is pivotally connected to a brake pad holder 4. Its pivot axis is parallel with the pivot axis mentioned above and thus with the center-line CL.

Each brake pad holder 4 is provided with an exchangeable brake pad 5 for frictional engagement with the brake disc (not shown). The brake pad 5 is the wear element of the disc brake and is replaced with a new one when worn out.

Figure 6:
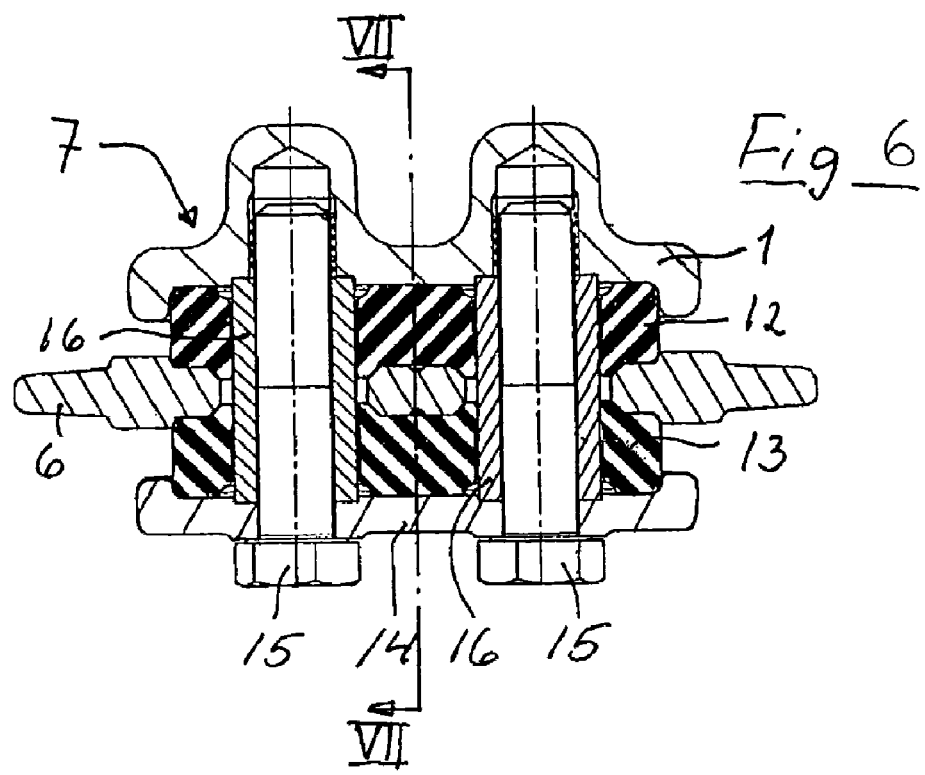
FIG. 6 is a sectional view from the rear to a larger scale of a joint in the caliper.
Figure 7:
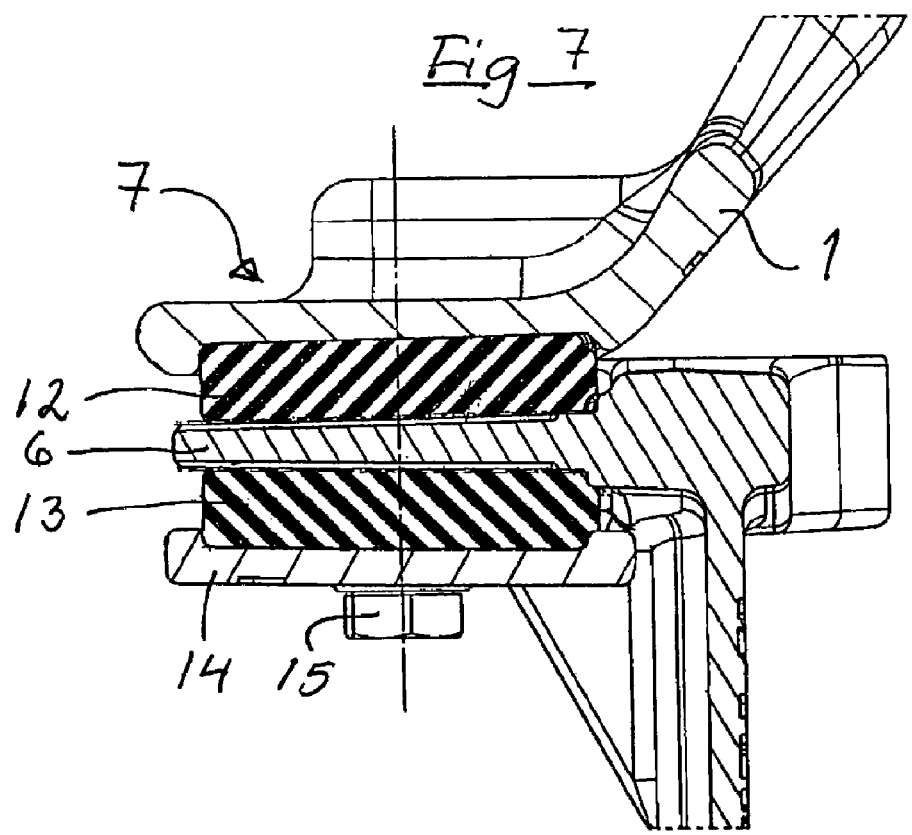
FIG. 7 is a sectional side view of the same joint along the line VII-VII in FIG. 6, and FIGS. 8a-g are very schematic illustrations of the relationship between the different members of the caliper under different conditions.

A bridge piece 6 is connected to the mounting bracket 1 by a joint collectively numbered 7 and further described below with special reference to FIGS. 6 and 7.

An upper lever 8 and a lower lever 9 at each side of the disc brake caliper are at their central portions pivotally attached to the bridge piece 6. An axle 10 is provided between the two levers 8 and 9. The forward ends of the levers 8 and 9 are pivotally attached to the brake pad holder 4 (to the left in Figs 3 and 4) around a pivot axis perpendicular to the center-line CL (FIGS. 1 and 2).

As is only shown in FIG. 3, a brake unit 11 is pivotally connected to and suspended by the rear ends of the brake levers 8 and 9. A brake unit generally comprises a brake cylinder—most often a pneumatic brake cylinder—and a built-in slack adjuster or brake regulator. At the admission of air under pressure to the brake cylinder, the brake unit 11 will press the rear ends of the levers 8 and 9 apart and the forward ends thereof together for brakingly applying the brake pads 5 against the brake disc. (The term "brake unit" is not meant to exclude a plain brake actuator without a slack adjuster.)

As is well known in the art, the function of the slack adjuster or brake regulator in the brake unit 11 is to keep the rest distance between the brake pads 5 and the brake disc constant irrespective of the wear of the brake pads. As a result the levers 8 and 9 will assume different pivotal rest positions depending on the wear situation for the brake pads 5.

It is well known in the art that the space allowed in the undercarriage or bogie of a rail vehicle for a disc brake caliper is very limited and that it is most desirable to minimize the volume requirement for the disc brake caliper. The present disc brake caliper is designed with this requirement in mind, which i.a. means that the levers 8 and 9 are kept as short as possible, so that the overall dimensions of the caliper are kept at a minimum and that the brake disc in operation will be close to the bridge piece 6. This on the other hand means that the angular movements of the levers during operation are increased. The suspended brake pad holders 4 will accordingly experience undesirably great movements in relation to the brake disc. The caliper design is based on a generally firm guiding by the suspension links 3 of the brake pad holders 4 to a plane perpendicular to the center-line CL of the brake caliper and a resilient guiding of all other elements of the caliper in all directions, which is accomplished by the design of the elastic joint 7 between the mounting bracket 1 (i.e. the undercarriage or bogie in mounted condition) and the bridge piece 6. The mounting bracket 1 and the bridge piece 6 are shown in FIGS. 6 and 7, to which reference is now made. These two members are connected only via generally plate-shaped rubber elements 12 and 13. An upper rubber element 12 is arranged between the mounting bracket 1 and the bridge piece 6, whereas a lower rubber element 13 is arranged between the bridge piece 6 and a plate 14. The rubber elements 12 and 13 have confined positions in relation to the mounting bracket 1, the bridge piece 6 and the plate 14, in that these members have recesses for the rubber elements.

The term "rubber" is meant to include any rubber- elastic material. The joint 7 is held together by means of screws 15, which in the shown case engage threads in the mounting bracket 1 and pass corresponding openings in the rubber elements 12 and 13. A fixed distance between the mounting bracket 1 and the plate 14 is created by means of distance sleeves 16 around the screws 15. The rubber elements 12 and 13 are prestressed at mounting for ensuring that they always work under a predetermined compression. The bridge piece 6 is provided with larger holes for ensuring its freedom to move to the necessary extent in all directions in relation to the bracket 1 and the plate 14.

With the joint 7 as shown and described and with suitable choice of dimensions and material for the rubber elements 12 and 13, it is possible to obtain linear and rotational movements with appropriate stiffnesses in all directions. The greatest stiffness is normally in the vertical direction or the direction of the screws 15. In order to obtain a specific characteristic for the joint 7, the portion of the bridge piece 6 in contact with the rubber elements 12 and 13 tapers slightly to the left in FIG. 7. This bridge piece portion is provided with a number of slots for obtaining an enhanced grip on the rubber.

Figure 8A:
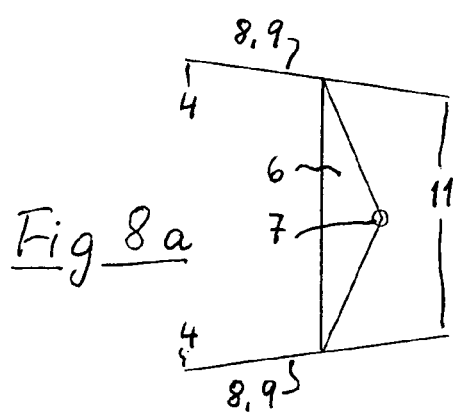

FIGS. 8a-g illustrate the relationship between the different members of the caliper under different working conditions. Only FIG. 8a is provided with reference numerals for the sake of clarity.

Thus, shown in FIG. 8a are the bridge piece 6 with the joint 7 and the levers 8, 9 pivotally connected thereto. Pivotally connected to the left ends of the levers 8, 9 (but not shown) are the brake pad holders 4 and to the right ends the brake unit 11. FIG. 8a illustrates the caliper at the beginning of a brake application with new, unworn brake pads 5 and with a new, unworn brake disc. Further, the brake disc is centered in relation to the caliper.

Figure 8B:
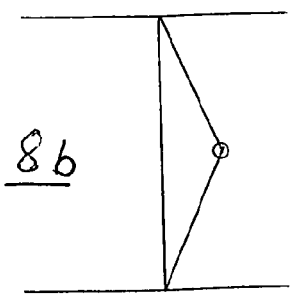

FIG. 8b is an illustration of the caliper of FIG. 8a somewhat later during braking.

Figure 8C:
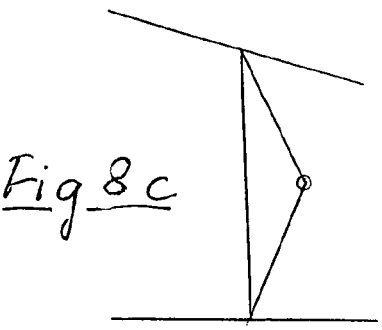

FIG. 8c corresponds to FIG. 8a with the difference that the brake disc is axially displaced (for example 20 mm) upwards in the Figure in relation to the caliper.

Figure 8D:
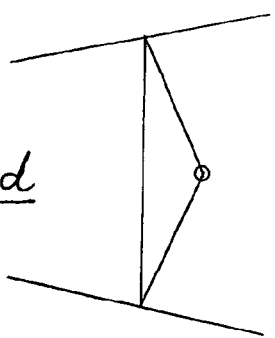

FIG. 8d illustrates the situation when the brake pads 5 as well as the brake disc are worn, but the brake disc is centered in relation to the caliper.

Figure 8E:
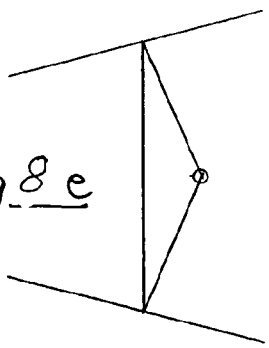
Figure 8F:
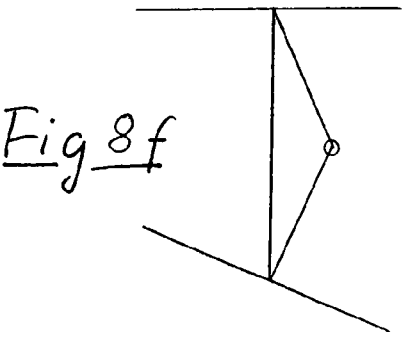

FIG. 8e corresponds to FIG. 8d but illustrates the situation when the brake pads 5 have been completely worn out. FIG. 8f corresponds to FIG. 8d but with the brake disc axially displaced upwards in the Figure in relation to the caliper.

Figure 8G:
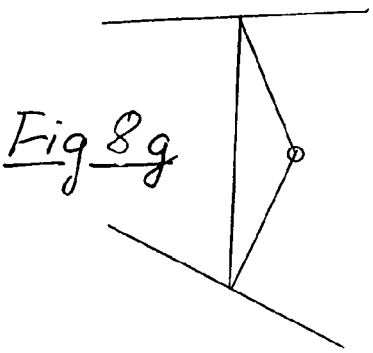

FIG. 8g corresponds to FIG. 8e but with the brake disc axially displaced upwards in the Figure in relation to the caliper.

The shown and described disc brake caliper is provided with a mounting bracket 1, from which all other elements of the caliper are suspended and which serves for mounting the caliper to the undercarriage or bogie of the rail vehicle. However, it is within the scope of the invention to abstain from the mounting bracket and for example suspend the suspension links 3 and the bridge piece 6 directly from the undercarriage or bogie via the elastic joint 7. Modifications are possible within the scope of the appended claims.

What is claimed is:

1. A disc brake caliper for a rail vehicle, comprising:
   a mounting bracket for rigid attachment to the rail vehicle;
   brake pad holders pivotally suspended, at either side of a brake disc to be braked, from said mounting bracket and moveable only in a plane perpendicular to a substantially horizontal center-line of the caliper;
   an elastic joint, wherein members of the caliper for transmitting movements from a brake unit to the brake pad holders are suspended from the vehicle via only elements of rubber-elastic material in the elastic joint allowing movements to a certain extent of said members in all directions;
   wherein the members of the caliper include a bridge piece and first and second levers for transmitting movements from the brake unit to the brake pad holders, the first and second levers being pivotally connected to the bridge piece; and
   wherein the elastic joint comprises at least one plate-shaped rubber-elastic element, which is substantially horizontally mounted in compression between the mounting bracket and the bridge piece.

2. The disc brake caliper according to claim 1, wherein the bridge piece is clamped without metallic connection between the mounting bracket and a first plate-shaped rubber element on the one side and a plate and a second plate-shaped rubber element on the other side, the plate being attached to the mounting bracket by means of screws.

3. The disc brake caliper according to claim 2, wherein the rubber elements are subjected to a predetermined compression in that the screws are surrounded by distance sleeves determining the distance between the mounting bracket and the plate.

4. The disc brake caliper according to claim 1, wherein the mounting bracket includes one or more holes for rigid attachment of the mounting bracket to the vehicle.

5. The disc brake caliper according to claim 1, further comprising two suspension links wherein each suspension link is pivotally attached to one of the brake pad holders.

6. The disc brake caliper according to claim 5, wherein each suspension link is further pivotally attached to said mounting bracket.

7. The disc brake caliper according to claim 1, wherein the at least one plate-shaped rubber-elastic element is pre-stressed.

8. The disc brake caliper according to claim 1, wherein the bridge piece includes first and second axles, wherein a central portion of the first lever is pivotally attached to the first axle and a central portion of the second lever is pivotally attached to the second axle.

9. The disc brake caliper according to claim 1, wherein the bridge piece portion includes a number of slots for an enhanced grip on the at least one plate-shaped rubber-elastic element.

10. The disc brake caliper according to claim 1, wherein the brake unit comprises a brake cylinder and a slack adjuster.

* * * * *